United States Patent [19]

Smeggil et al.

[11] 3,892,599

[45] July 1, 1975

[54] AIR-STABLE COMPACT OF COBALT-RARE EARTH ALLOY PARTICLES AND METHOD

[75] Inventors: John G. Smeggil, Elnora; Richard J. Charles, Schenectady, both of N.Y.

[73] Assignee: General Electric Company, Schenectady, N.Y.

[22] Filed: Mar. 14, 1974

[21] Appl. No.: 451,029

Related U.S. Application Data

[62] Division of Ser. No. 372,690, June 22, 1973, Pat. No. 3,856,582.

[52] U.S. Cl... 148/31.57; 117/100 M; 117/107.2 R; 148/103; 148/105
[51] Int. Cl.$^2$................ C04B 35/00; C23C 11/00
[58] Field of Search ........ 148/31.57, 101, 103, 105; 117/100 M, 107.2 R, 130; 29/192 CP; 264/58, DIG. 58; 75/20 F

[56] References Cited
UNITED STATES PATENTS

| | | | |
|---|---|---|---|
| 3,385,725 | 5/1968 | Schmeckenbecher | 117/130 |
| 3,433,632 | 3/1969 | Elbert et al. | 75/20 F |
| 3,591,428 | 6/1971 | Buschow et al. | 148/31.57 |
| 3,615,914 | 10/1971 | Becker et al. | 148/101 |
| 3,684,593 | 8/1972 | Benz et al. | 148/31.57 |

OTHER PUBLICATIONS

Harwood, J.; Industrial Applications of Organometallic Compounds, New York, 1963, pp. 88 and 384.

*Primary Examiner*—Walter R. Satterfield
*Attorney, Agent, or Firm*—Jane M. Binkowski; Joseph T. Cohen; Jerome C. Squillaro

[57] ABSTRACT

A process for producing novel air-stable magnetic products. An organometallic compound which decomposes at a temperature below 500°C is admixed with particles of a transition metal-rare earth alloy. The resulting mixture is pressed to form a green body which is then heated to decompose the organometallic compound to produce a metal vapor which deposits an interconnecting metal coating on the exposed surfaces of the pressed particles.

4 Claims, No Drawings

AIR-STABLE COMPACT OF COBALT-RARE EARTH ALLOY PARTICLES AND METHOD

This is a division of application Ser. No. 372,690, filed June 22, 1973, now Pat. No. 3,856,582.

The present invention relates generally to the art of making magnets. More particularly, it is concerned with air-stable magnets comprised of bonded magnetic transition metal-rare earth alloy powders which are provided with a protective interconnecting non-magnetic metal coating.

Magnetic properties of bulk magnetic materials having large magnetocrystalline anisotropies can be enhanced by reducing them to powders particularly those having an average particle size of less than 10 microns. The as-ground powders can be incorporated in bonding media to provide composite magnets having properties substantially superior to those of the bulk source materials. However, when good magnetic properties are attained in the as-ground powders, for example, cobalt-rare earth powders, they tend not to be stable. As the powders are exposed to air at room temperature and at slightly elevated temperatures, their intrinsic coercive force, $H_{ci}$, which is a measure of a magnet's resistance to demagnetization, decreases irreversibly. Specifically, these magnetic powders are quite reactive to oxygen and water vapor in the atmosphere at room temperature, and they are even more so reactive at even slightly elevated temperatures, i.e., about 100°C, resulting in a significant loss in their intrinsic coercive force. Thus, a comparatively low value of intrinsic coercive force can substantially diminish the advantages to be gained converting the bulk body to a powder, or producing the powder by some other technique, and fabricating a composite finished article from the powder.

The art has used sintering to produce magnets with substantially stable properties from these powders. This process comprises compacting the powder to form a green body and sintering the body at high temperatures, generally about 1000°C, in an inert atmosphere to produce a high density compact having a closed pore structure. Such a structure protects the magnet from the atmosphere resulting in long term stability of its magnetic properties. However this method is expensive, since it requies power-consuming equipment and handling procedures which are time-consuming.

A more desirable approach to the fabrication of magnets using these powders, for example cobalt-rare earth alloy powders, would delete the sintering process and merely compact the aligned particles into the desired shape with the aid of some kind of binder. However, to do this requires the use of air stable, accordingly coated, cobalt-rare earth alloy particles.

Attempts to provide cobalt-rare earth alloy powder with a protective metal coating deposited from metal vapor of a molten metal have yielded limited success. For example, temperatures of 500°C and higher significantly deteriorate the magnetic properties of the loose powder. Such a method, therefore, can utilize only a very few low melting metals, which also must produce sufficient vapor pressures for effective coating deposition at temperatures not much higher than their melting point, such as lead with a melting point of 328°C or zinc with a melting point of 419°C. However, most metals, especially those which are most inert and generally the most desirable, have very high melting points and usually require temperatures significantly higher than their melting points to produce vapor pressures which are effective for coating. For example, aluminum, a highly inert and desirable metal, melts at 660°C and requires significantly higher temperatures to produce vapor pressures useful for coating, and tungsten, another desirable metal, melts at 3370°C. Not only do such high temperatures make deposition of the metal from the vapor of the molten metal impractical, but also these vapors would be so hot as to significantly deteriorate the properties of the present magnetic transition metal-rare earth alloy powders.

Similarly, the coating of cobalt-rare earth alloy particles by electroless plating techniques is not highly attractive since these methods require placing the very fine, generally 10 micron average particle size, and consequently very reactive cobalt-rare earth alloy powders into contact with an aqueous solution which is highly acidic and results in the dissolution of significant amounts of material. These plating techniques also do not appear to produce a continuous uniform coating on these fine particles. In addition, long term deleterious effects on the magnetic properties of the cobalt-rare earth alloy powders can be expected from the direct effects of the acidic aqueous solutions or from amounts of water entrapped within the metal coating in the thin layer of Co and $Sm_2O_3$ surrounding each particle which reacts slowly with the base cobalt-rare earth alloy.

In copending U.S. Pat. application Ser. No. 372,691 now U.S. Pat. No. 3,856,580 filed of even date herewith in the names of Richard J. Charles and John G. Smeggil entitled "Air-Stable Magnetic Materials and Method", which is incorporated herein by reference, there is disclosed a process which overcomes the disadvantages of the prior art. It provides a solution to the oxidation problem of these reactive materials and obviates the sintering procedure by coating the powders with a coherent and non-reactive metal without significantly affecting the magnetic properties of the powder. Briefly stated, the process disclosed in that copending application comprises providing particles of a magnetic transition metal-rare earth alloy, heating an organometallic compound to decompose said compound and produce a metal vapor, and contacting said metal vapor with said particles to deposit a coating of metal thereon. These metal-coated alloy particles can be magnetized and pressed into a compact to form a magnet. They can also be magnetized and distributed in a non-magnetic matrix and the resulting mixture pressed into a compact useful as a magnet. However, care must be exercised in carrying out the pressing operation to avoid rupturing of the protective metal coating which would lead to subsequent oxidation and degradation of the exposed alloy particles by the atmosphere. On occasion, in order to avoid rupturing of the metal coating, high pressures may be avoided in forming the compacts thereby producing compacts with a packing not as close as would be desirable to get the strongest magnetic properties. The present invention overcomes this rupturing problem.

Briefly stated, the present process comprises admixing particles of a magnetic transition metal-rare earth alloy with an organometallic compound, pressing the resulting mixture to form a green body, and heating said green body to decompose said organometallic compound to form a metal vapor which deposits a metal coating on said particles of alloy which is interconnecting.

The porous magnetic compact of the present invention has magnetic properties which are stable in air. Specifically, it is comprised of compacted transition-rare earth alloy particles, the exposed surfaces of which have a continuous adherent coating of metal and/or its oxide which is interconnecting and which provides the compact with an effective barrier to the atmosphere.

In the present process a magnetic transition metal-rare earth alloy, e.g., TRE, where T is a transition metal and RE is a rare earth metal, is used in particle form. The transition metal is selected from the group consisting of cobalt, iron, nickel, manganese and alloys thereof.

The rare earth metals useful in forming the present process are the 15 elements of the lanthanide series having atomic numbers 57 to 71 inclusive. The element yttrium (atomic number 39) is commonly included in this group of metals and, in this specification, is considered a rare earth metal. A plurality of rare earth metals can also be used to form the present intermetallic compounds which, for example may be ternary, quartenary or which may contain an even greater number of rare earth metals as desired. Mischmetal, an abundant common alloy of rare earth metals, is particularly advantageous.

Representative of the cobalt-rare earth compounds useful in the present invention are cobalt-cerium, cobalt-praseodymium, cobalt-neodymium, cobalt-promethium, cobalt-samarium, cobalt-europium, cobalt-gadolinium, cobalt-erbium, cobalt-thulium, cobalt-ytterbium, cobalt-lutecium, cobalt-yttrium, cobalt-lanthanum and cobalt-mischmetal. Examples of specific ternary compounds include cobalt-cerium-praseodymium, cobalt-yttrium-praseodymium, and cobalt-praseodymium-mischmetal.

Transition metal-rare earth intermetallic alloys or compounds exist in a variety of phases and each phase may vary in composition. A material substantially comprised of the $T_5RE$ single phase is particularly preferred in the present invention since this phase has shown the most desirable combination of magnetic properties.

The transition metal-rare earth compound or alloy of the present process can be prepared by a number of methods. For example, it can be prepared by melting the transition metal and rare earth metal together in the proper amounts under a substantially inert atmosphere such as argon and allowing the melt to solidify.

The alloy can be converted to particulate form in a conventional manner. For example, it can be crushed to a coarse size and then pulverized to a finer form by, for example, fluid energy milling in a substantially inert atmosphere. Alternatively, the powder can be produced initially by a reduction-diffusion process as set forth in copending application Ser. No. 172,290, filed on Aug. 16, 1971 in the name of Robert E. Cech, now U.S. Pat. No. 3,748,193. Also, in some instances, it may be desirable to grind sintered compacts of these powders to a desired particle size.

The particle size of the transition metal-rare earth alloy used in the present process may vary. It can be in as finely divided a form as desired. For best magnetic properties, average particle size ranges from about 1 micron or less to about 10 microns. Larger sized particles can be used, but as the particle size is increased, the maximum coercive force obtainable is lower because the coercive force decreases with increasing particle size.

In the present invention, an organometallic compound is used which can be a solid or a liquid at room temperature and which decomposes at temperatures lower than 500°C to produce a metal vapor. In carrying out the present process, the organometallic compound and the TRE alloy powder should be admixed to produce a substantially intimate mixture. When the organometallic compound is a solid at room temperature, it is preferably used in a fine powder form in order that it can form an intimate mixture with the TRE alloy particles. When the organometallic is a liquid at room temperature, it should be admixed with the alloy particles to thoroughly wet the surfaces thereof and preferably to form a slurry therewith. A substantially intimate mixture is necessary so that when the mixture is pressed into a green body and the green body is heated to decompose the organometallic, the resulting metal vapor which deposits metal on contact with the surfaces of the pressed alloy powder, will be distributed substantially uniformly throughout the powder to deposit a substantially continuous coating thereon and throughout the resulting compact to provide an effective barrier to the atmosphere.

The mixture can be pressed in a conventional manner to produce a green body of desired packing or density. For example, it can be die-pressed and preferably, it is subjected to a magnetizing aligning field prior or during the pressing operation to magnetically align the alloy particles along a preferred axis. Where the organometallic is a liquid, means can be provided for removal of excess liquid during the pressing operation. The density of the green body should be sufficient to allow handling and depends somewhat on the binding properties of the organometallic compound itself as well as the density or packing desired in the resulting metal-coated compact.

The resulting green body is heated in an atmosphere in which the reactants are inert, e.g., an atmosphere in which the green body is inert, to decompose the organometallic to produce the metal vapor which on contact with the exposed surfaces of the pressed alloy particles condenses metal thereon. Typical inert atmospheres suitable in the present invention include argon, nitrogen or a vacuum. No water vapor or oxygen is present to degrade the magnetic properties of the alloy materials.

In the present process, the amount of organo-metallic compound used is determinable empirically. It should be used in an amount which, on decomposition, is sufficient to produce an amount of metal vapor which condenses on the exposed surfaces of the pressed alloy particles to form a continuous coating of metal thereon thereby preventing penetration by the atmosphere. Specifically, the organometallic compound should be used in an amount which on decomposition, produces the metal in an amount ranging from 1 to 5% by weight of the transition metal-rare earth alloy powder. From formulas and atomic weights, the weight relationships between the substances in the reaction can be calculated readily. Amounts of deposited metal less than 1% by weight of the alloy powder are likely to result in a discontinuous coating whereas amounts of deposited metal significantly greater than 5% by weight of the alloy powder will dilute the magnetic properties of the powder. Best results are attained with the metal being deposited in an amount of 2% by weight of the alloy powder. The organometallic compound may decompose initially to yield the metal vapor or it may decompose to yield another organometallic vapor which is then decomposed to give the metal vapor.

One method of determining that a continuous coating of metal has been formed on the exposed surfaces of the pressed alloy particles is to magnetize the compact, measure its intrinsic coercive force at room temperature, heat the compact in air at an elevated temperature, for example 100°C, for a significant period of time, i.e., at least about 30 minutes, and remeasure its intrinsic coercive force in the same manner. If the intrinsic coercive force is not significantly lower than before the heating, it can be considered as being effectively coated in accordance with the present invention.

The compact of the present invention contains metal coating which is continuous on the exposed surfaces of the pressed particles and adherent thereto and provides an effective barrier to the atmosphere. The metal coating throughout the compact is substantially interconnecting and supports the particles, e.g., it is a matrix or at least a partial matrix for the alloy particles. The minimum thickness of the metal coating need only be sufficient to make it continuous, e.g., at least a film-forming thickness which is about one microinch, to prevent air from penetrating to the surface of the pressed alloy particles. In some instances where a metal may form a porous oxide, thicker continuous coatings of the metal should be deposited to make the outer portion of such a metal coating available to be oxidized by the air leaving an inner continuous metal coating to maintain the stability of the magnetic properties of the pressed alloy particles. However, a number of metals, for example, aluminum, form non-porous oxides which are effective barriers to air. Metal coatings significantly thicker than that necessary to provide the pressed alloy particles with an effective barrier to the atmosphere provide no particular advantage since they do not improve magnetic stability and may prevent a close packing of the alloy particles thereby diluting the magnetic properties. Metal coatings thicker than necessary can be useful if such metal is also to add strength to the compact.

Since the non-metallic products of decomposition are gaseous, or will usually be evaporated from the body during the decomposition step, or can be evaporated therefrom at temperatures below 500°C, the resulting compact is always porous to some extent due to the outgassing therefrom of these non-metallic products. Since the non-metallic products of decomposition are much less dense and significantly more easily vaporizable then the deposited metal, they do not interfere with the formation of continuous metal coatings in the present invention. The extent of porosity in the resulting compact depends largely on the extent of gaseous products emanating therefrom. The porosity can be significantly minimized by carrying out the decomposition of the organometallic in a substantial vacuum. Generally, the porosity of the present compact ranges from about 5 to 40 percent by volume. Such porosity can be measured by standard technique.

In the present invention the vapor-deposited solid should have a number of properties. Specifically, it should provide a barrier to the atmosphere, and also, if desired, the metal coating can be chosen for some other desired property, e.g., ductility. The metal, itself, should have no significant deteriorating effect on the magnetic properties of the alloy powder. It should be non-magnetic or so weakly magnetic as not to diminish the magnetic properties of the powder significantly.

In the present invention, the coating can be composed of more than one metal to form an alloy depending on the particular properties desired. A plurality of organometallics can be used to deposit a plurality of metals, for example Cu and Zn, can be deposited concommitantly in any proportion to form an alloy coating on the pressed particles.

In the present process, there are a number of useful organometallic compounds which decompose at temperatures below 500°C. Typical of these is triisobutylaluminum as a source of aluminum. Specifically, the metal coating of aluminum can be deposited according to the following reactions:

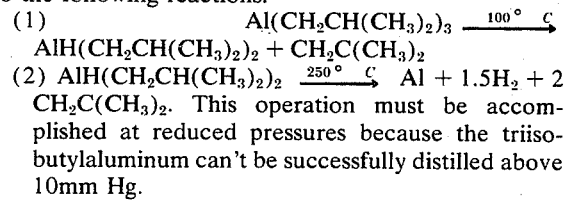

(2) $AlH(CH_2CH(CH_3)_2)_2 \xrightarrow{250°C} Al + 1.5H_2 + 2 CH_2C(CH_3)_2$. This operation must be accomplished at reduced pressures because the triisobutylaluminum can't be successfully distilled above 10mm Hg.

There are a number of advantages to the use of triisobutylaluminum and other organometallics which decompose in a similar manner. One advantage is that the low temperature at which this organometallic decomposes will not affect the magnetic properties of the transition metal-rare earth alloy powder. Another advantage is that the amount of chemical interaction between the aluminum and the alloy powder should be minimal at these temperatures. Yet another advantage is that the hydrogen gas present can be expected to reduce any surface oxides present on the alloy particles. In addition, the organometallic decomposition reaction is relatively clean and yields products, except for elemental Al, which are gases and are accordingly easily removed from the coated powders.

A typical example of an organometallic useful in the present invention for the vapor deposition of copper is phenylcopper, $C_6H_5Cu$, which thermally degrades according to the following reaction:

3. 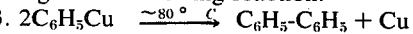

This reaction affords advantages similar to those listed for the Al deposition, and in addition, it takes place at a very low temperature.

Table I lists a partial series of elemental metals useful as coatings and their organometallic compounds suitable for the present process. In the present invention, metal carbonyls are assumed to be organometallic compounds.

TABLE I

| Metal | Organometallic Compound |
|---|---|
| Cu | Copper formate, $Cu(CH O_2)_2$ |
| | Copper acetylacetonate ($Cu(CH_3COCHCOCH_3)_2$) |
| | Methylcopper, $CuCH_3$ |
| Ni | Nickel carbonyl, $Ni(CO)_4$ |
| Fe | Iron carbonyl $Fe(CO)_5$ |
| Cr | Chromium carbonyl, $Cr(CO)_6$ |
| | Bisbenzene chromium, $Cr(C_6H_6)_2$ |
| Mo | Molybdenum carbonyl, $Mo(CO)_6$ |
| | Bisbenzene molybdenum, $Mo(C_6H_6)_2$ |
| | Benzene molybdenum carbonyl, $C_6H_6 Mo(CO)_3$ |
| W | Dibenzene tungsten, $W(C_6H_6)_2$ |
| | Mesitylene tungsten carbonyl, $(CH_3)_3 C_6H_3 W(CO)_3$ |
| | Tungsten carbonyl, $W(CO)_6$ |
| Ru | Ruthenium carbonyl, $Ru(CO)_3$ and/or $Ru_2(CO)_9$ |
| Ir | Iridium carbonyl, $Ir_2(CO)_8$ |
| V | Vanadium carbonyl, $V(CO)_6$ |

TABLE I-Continued

| Metal | Organometallic Compound |
|---|---|
| | Bisbenzene vanadium, $(C_6H_6)_2V$ |
| Hf | Dicyclopentadienyl hafnium dichloride, $(C_5H_5)_2$ Hf $Cl_2$ |
| Ta | Tantalum methylcyclopentadienyl tetracarbonyl, $CH_3C_5H_5Ta(CO)_4$ |
| Nb | Niobium methylcyclopendadienyl tetracarbonyl, $CH_3C_5H_5Nb(CO)_4$ |
| Zn | Diethylzinc, $Zn(C_2H_5)_2$ |
| | Dimethyl zinc, $(CH_3)_2$ |
| | Zinc acetylacetonate $(Zn(CH_3COCHCOCH_3)_2)$ |
| Be | Diethyl beryllium, $(C_2H_5)_2Be$ |
| Mg | Diphenylmagnesium, $Mg(C_6H_5)_2$ |
| | Diethylmagnesium, $Mg(C_2H_5)_2$ |
| Sn | Tetramethyl tin, $Sn(CH_3)_4$ |
| Bi | Trimethyl bismuth, $Bi(CH_3)_3$ |
| Au | Diethyl gold bromide, $((C_2H_5)_2 AuBi)_2$ |
| Pb | Tetraethyl lead, $Pb(C_2H_5)_4$ |
| Mn | Dicyclopentadienyl manganese, $(C_5H_5)_2Mn$ |
| Re | Rhenium carbonyl, $Re_2(CO)_{10}$ |
| Rh | Rhodium carbonyl, $Rh_2(CO)_8$ |
| Ti | Dicyclopentadienyl titanium, $(C_5H_5)_2Ti$ |

In addition to the above organometallics listed in Table I, there are a number of trifluoroacetylacetonates and hexafluoroacetylacetonates of various metals, e.g., Zn and Zr which could yield the desired metal coating.

The present metal-coated compacts, when magnetized, are useful as magnets which are air-stable at room temperature. Their magnetic properties also do not significantly deteriorate in air at elevated temperatures which do not affect the barrier coating to expose the surfaces of the pressed alloy particles.

If desired, the pores of the present metal-coated compacts can be infiltrated or impregnated with a nonmagnetic material. Representative of suitable non-magnetic materials is a plastic or resin, an elastomer, or rubber, or a non-magnetic metal such as, for example, lead, tin, zinc, copper or aluminum.

The present solid metal-coated compact can be annealed to increase its intrinsic coercive force by at least 10%. To carry out the annealing, the coated compact is heated at a temperature ranging from about 50°C to about 200°C. Specifically, the annealing temperature should not be so high as to deteriorate the barrier coating of the compact to any significant extent. On the other hand, temperatures below 50°C are not effective. Annealing can be carried out in an atmosphere in which the coated compact is inert, for example, argon, or in a substantial vacuum or in air. The particular annealing period of time to increase intrinsic coercive force by at least 10% depends largely on annealing temperature and can range from 30 minutes to 100 hours with longer times being required at lower temperatures.

The magnetized compacts of the present invention are useful in telephones, electric clocks, radios, television, and phonographs. They are also useful in portable appliances, such as electric toothbrushes and electric knives, and to operate automobile accessories. In industrial equipment, the present magnets can be used in such diverse applications as meters and instruments, magnetic separators, computers and microwave devices.

All parts and percentages used herein are by weight unless otherwise noted.

The invention is further illustrated by the following examples.

EXAMPLE 1

A sintered body of compacted CoSm alloy powder, prepared substantially as set forth in U.S. Pat. No. 3,655,464, was ground to a powder using a jaw crusher and a jet mill. The alloy powder was comprised substantially of $Co_5Sm$ phase and a minor amount of $Co_7Sm_2$ phase. 7 grams of the alloy powder ranging in size from +44 to −77 microns were admixed with 0.6 gram of copper acetylacetonate, present as the hydrate $Cu(CH_3COCHCOCH_3)_2 \cdot 2H_2O$, and in powder form, to form a substantially intimate mixture. It was calculated that in this mixture the copper acetylacetonate yielded copper in an amount of about 2% by weight of the alloy powder.

The mixture was placed in a die press and pressed under a pressure of about 300,000 psi at room temperature, for about 2 minutes. The resulting green body was in the form of a rod. Four rods were prepared in this manner with each rod being about ¼ inch in diameter and about 1 or ½ inch in length. One of the rods was broken and examined. It showed that the copper acetylacetonate was substantially uniformly distributed throughout the rod. The three remaining rods were heated under a stream of argon to decompose the copper acetylacetonate, which occurred at a temperature of about 400°C and which was readily detected by the appearance of a coppery color on the rods. The rods were heated at a temperature of 425°C for 5 minutes to insure the complete decomposition of the copper acetylacetonate and then cooled to room temperature in argon. All of the resulting copper-coated rods had a continuous coating of copper on their outside surfaces.

One of these copper coated rods was broken in half and examined visually. It appeared to be porous and about 40% of its inside surfaces had a coppery color which was distributed substantially uniformly therethrough indicating that the decomposition of the copper acetylacetonate had taken place throughout the compact to deposit copper thereon.

The remaining two copper-coated rods were sliced, polished and examined metallographically. Each specimen appeared to be porous in an amount of about 10% by volume. About 40% of the cut surfaces of each specimen had a coppery color which was distributed substantially uniformly therethrough and which was substantially interconnecting indicating that decomposition of the copper acetylacetonate to deposit the copper coating had taken place throughout each rod.

EXAMPLE 2

A mixture of cobalt-samarium alloy powder and copper acetylacetonate was prepared as set forth in Example 1 except that the size of the alloy powder was −325 mesh, e.g., an average particle size of about 6 microns. The mixture was placed in a die press and subjected to an aligning magnetizing field of 20,000 oersteds to align the particles along their easy axis. The mixture was pressed under a pressure of about 100,000 psi at room temperature for at least about 2 minutes to form a green body which in the form of a rod about ¼ inch in diameter and about 178 inch in length.

The rod was heated as set forth in Example 1 to decompose the copper acetylacetonate completely.

The resulting copper-coated rod was magnetized in a magnetizing field of about 60,000 oersteds at room temperature. The resulting magnet displayed useful magnetic properties as demonstrated by using it to lift a number of small metallic objects.

EXAMPLE 3

A copper-coated rod is prepared as set forth in Example 2.

It can then be heated in an air atmosphere oven at a temperature of 100°C for about 2 hours.

It can then be magnetized as set forth in Example 2. The resulting magnet can be expected to have an intrinsic coercive force at least 10% higher than that in Example 2.

In copending U.S. Pat. application Ser. No. 372,688 now U.S. Pat. No. 3,856,581, entitled "Annealed Air-Stable Magnetic Materials Having Superior Magnetic Characteristics And Method" filed of even date herewith in the names of Richard J. Charles and John G. Smeggil there is disclosed a process for producing air-stable coated particles of a magnetic material which comprises providing particles of a transition metal-rare earth alloy and an organometallic compound which decomposes at a temperature lower than 500°C, heating the organometallic compound to decompose it to produce a metal vapor, contacting the metal vapor with the particles of transition metal-rare earth alloy to deposit a metal coating thereon which substantially envelops the particles, and heating the metal coated particles at a temperature ranging from about 50°C to 200°C to increase their intrinsic coercive force by at least 10%.

In copending U.S. Pat. application Ser. No. 372,689 now U.S. Pat. No. 3,853,640, entitled "Lubricants For Pressing Transition Metal-Rare Earth Powders To Be Sintered" filed of even date herewith in the name of John G. Smeggil there is disclosed a process for producing a sintered product of compacted particulate magnetic transition metal-rare earth alloy material which comprises admixing particles of a transition metal-rare earth alloy with a lubricating organometallic compound and pressing the mixture to form a green body. The green body is heated to decompose the organometallic compound which decomposes below 500°C to yield a metal vapor which deposits metal in the body and a non-metal specie of decomposition which diffuses out of the body, and sintering the body to a density of at least about 87%.

What is claimed is:

1. An air-stable porous magnetic compact comprised of compacted cobalt-rare earth alloy particles, the exposed surfaces of said compacted alloy particles having a continuous adherent coating of metal which is interconnecting and which provides said compact with an effective barrier to the atmosphere, said magnetic compact being produced by a process for depositing a substantially interconnecting adherent coating of a metal having a melting point above 500°C on the exposed surfaces of pressed particles of cobalt-rare earth alloy without significantly deteriorating their permanent magnet properties producing a magnetically air-stable compact which comprises providing particles of cobalt-rare earth alloy having an average size up to about 10 microns, providing an organometallic compound which is a solid or liquid at room temperature and which at a temperature below 500°C decomposes and yields products of decomposition consisting of gaseous non-metallic product and a metal vapor, admixing said organometallic compound and said particles of alloy to form a substantially intimate mixture, said organometallic compound being used in an amount which on decomposition produces the metal in an amount ranging from 1 to 5% by weight of said cobalt-rare earth alloy particles, pressing said mixture to form a green body, heating said green body in a substantially inert atmosphere which is a flowing atmosphere or a substantial vacuum at a temperature below 500°C and substantially completely decomposing said organometallic compound and producing said gaseous product of decomposition and metal vapor, said metal vapor depositing a substantially interconnecting continuous coating of metal having a melting point above 500°C on the exposed surfaces of said pressed particles substantially uniformly throughout said body and having no significant deteriorating effect on the magnetic properties of said alloy particles, said deposited metal supporting said particles and providing the resulting compact with an effective barrier to the atmosphere, said non-metallic gaseous product of decomposition diffusing away from said body leaving the resulting compact porous in an amount ranging from about 5 to 40 percent by volume of said compact.

2. An air-stable product according to claim 1 wherein said vapor-deposited metal is aluminum.

3. An air-stable product according to claim 1 wherein said vapor-deposited metal is copper.

4. An air-stable magnet having as the active magnetic component the compact of claim 1.

* * * * *